G. E. MOLYNEUX.
SEWING MACHINE.
APPLICATION FILED AUG. 9, 1911.

1,024,691.

Patented Apr. 30, 1912.

UNITED STATES PATENT OFFICE.

GEORGE E. MOLYNEUX, OF BAYONNE, NEW JERSEY, ASSIGNOR TO THE SINGER MANUFACTURING COMPANY, A CORPORATION OF NEW JERSEY.

SEWING-MACHINE.

1,024,691. Specification of Letters Patent. Patented Apr. 30, 1912.

Application filed August 9, 1911. Serial No. 643,079.

*To all whom it may concern:*

Be it known that I, GEORGE E. MOLYNEUX, a citizen of the United States, residing at Bayonne, in the county of Hudson and State of New Jersey, have invented certain new and useful Improvements in Sewing-Machines, of which the following is a specification, reference being had therein to the accompanying drawings.

This invention relates especially to feed-up-the-arm sewing machines constructed with a frame comprising a hollow standard with a horizontally extending tubular work-supporting horn containing the loop-taker mechanism in its outer end and an overhanging bracket-arm in which is journaled a vertically reciprocating needle-bar carrying the needle, a rotary main or driving shaft being journaled in and longitudinally of the frame with an operative connection with one member of the stitch-forming mechanism at its forward end and a pulley upon its rearward end to which power is applied for driving the machine. This class of machines is commonly secured upon the work-table or support with the end carrying the stitch-forming mechanism nearest the operator to whom a hand-wheel upon the driving shaft is not readily accessible, for which reason it has been the practice heretofore to gear to the main-shaft intermediate its ends a complemental transverse shaft carrying a hand-wheel within the convenient reach of the operator.

The object of the present improvement is to provide the transverse hand-wheel shaft with a connection with the main-shaft comprising an automatically operable clutch which is sufficiently powerful in its action to insure a practically positive connection between such shafts when the machine is not running or is running very slowly, in order to permit the operator to turn or arrest the mechanism by hand, while effecting the disconnection of such shafts when the machine is in normal operation.

In the preferred form of the invention, the rotary driving shaft is journaled in and extends longitudinally of the work-supporting arm and through the hollow standard in which latter is journaled the angularly arranged hand-wheel shaft having upon its inner end a bevel-gear in permanent operative relation with a similar gear loosely mounted upon the main-shaft and carrying one member of a friction clutch adapted for operative engagement with a second clutch member slidingly mounted upon and splined to the driving shaft and adapted to be moved toward and from the first-named clutch member by means of a cylindrical governor rotating with the main-shaft. The improvement also includes certain details of construction of such mechanism.

The invention will be understood by reference to the accompanying drawing, in which—

Figure 1 is a sectional elevation of the lower portion of the standard and the rearward part of the cylinder-bed of a sewing machine constructed substantially in accordance with my application Serial No. 521,801, filed October 9, 1909, but showing a modification of the hand-wheel shaft driving connection therein represented; and Fig. 2 is a sectional plan of the same. Fig. 3 is a sectional elevation, upon an enlarged scale, of the loose clutch member and its supporting collar, and Fig. 4 a face view of said collar, which carries the adjustable feed-actuating eccentric. Fig. 5 is a perspective view of the locking washer for confining the loose clutch member in position upon its supporting collar. Fig. 6 is a sectional elevation of the sliding clutch member.

As represented in the drawing, the machine frame is constructed with the hollow upright standard 1 to which is secured by screws 2 the flange 3 of the laterally extending cylinder-arm or work-support 4 through which extends lengthwise the rotary main or driving shaft 5 which is shown journaled in the bearing boss 6 extending inwardly from the cylinder-arm flange 3 and the boss 7 at the rear of the standard 1. The main-shaft has secured upon its rearward end the grooved belt-wheel 8 to which is imparted, through the usual belt, the power for rotating the main-shaft.

Mounted in the bearing boss 9 at one side of the base 1 is the hand-wheel shaft 10 whose axis intersects that of the main-shaft, and which has fixed upon its outer end the hand-wheel 11 and upon its inner end, by means of the set-screw 12, the hub 13 of the bevel gear-wheel 14.

Sustained in permanent intermeshing relation with the bevel-gear 14 is the bevel-gear 15 whose hub 16 is slidingly journaled upon the annular seat 17 of a collar 18 formed with a key-way 19 by means of which it is secured upon the main-shaft, the collar 18 being provided with a flange 20 to which is adjustably secured by means of the screws 21 and 22 the lateral ears 23 and 24 of the feed-actuating ball-eccentric 25, the screw 21 passing through the slot 26 in the flange 20 and being tapped into the ear 23 of the eccentric to afford lateral adjustment thereof relative to the shaft. The periphery of the collar 18 is formed adjacent the seat 17 with the annular groove 27 which is entered by the U-shaped locking washer 28 for confining the gear-hub 16 in position upon its supporting collar. As represented in Fig. 5, the washer is formed with a lateral opening 28$^x$ of slightly less width than its bore and it is made of resilient material so as to closely embrace the bottom of the groove 27 and to slightly resist lateral disengagement therefrom.

The rearward face of the gear 15 is formed with an annular recess whose conical outer wall 29 affords one member of a friction-clutch of which the other member is the conical periphery 30 of the disk 31 whose hub 32 is fitted slidingly upon the driving shaft and provided with the key-way 33 to receive the spline 34 by means of which it is connected to rotate with the supporting shaft while movable into and out of frictional driving relation with the clutch-member 29. The clutch-member 30 is preferably provided with a non-metallic facing 30$^x$, such as leather, to insure an effective frictional contact between the clutch-members.

The driving shaft 5 is restrained against endwise movement by means of the hub of the belt-pulley 8 engaging the rearward end of the bearing boss 7 and the collar 35, of the centrifugal governor which is fixed upon the shaft by means of the set-screws 36 and bears against the forward end of the bearing boss 7. The collar 35 is provided with the forwardly and divergently extending lateral arms 37 each provided at its outer end with a slot 38 in which is pivotally mounted by means of the transverse screw-pin 39 an angle-lever having one arm 40 carrying the spherical weight 41 and an inwardly extending arm formed with the rounded extremity 42 which enters the annular groove 43 in the hub 32 of the sliding clutch-member. A spring 44 interposed between the collar 35 and the clutch-hub 32 serves to normally press the driving clutch-member into operative relation with the driven clutch-member and to maintain the weights 41 in their extreme inner positions nearest the shaft. When the rotation of the driving shaft is partially or wholly arrested, the retractive force of the weights 41 upon the sliding clutch-collar 32 is insufficient, if existent at all, to overcome the action of the governor-spring 44, and the interengaging parts of the clutch are therefore pressed into operative relation, whereby the hand-wheel 11 is coupled to the driving shaft and affords a means of manually stopping the main-shaft in the stage of its stitch-forming operation desired by the operator, if the machine is in motion, or to enable the operator to turn the shaft in one or the other direction for any required manipulation of the work, in case the machine is at rest. When the machine is set in motion for a stitching operation, the centrifugal action of the weights 41 gradually counteracts the stress of the spring 44 and retracts the driving clutch member from operative relation with the driven clutch member so as to permit the hand-wheel shaft to come to rest and thereby save both the wear and the noise of operation of the permanently intermeshing gears 14 and 15, while reducing the weight of the rotating parts so as to increase the sensitiveness of the machine in effecting changes of speed through the actuating mechanism of the driving shaft.

The present construction has the advantage, over that disclosed in my said application, of producing a much more powerful driving relation between the driving shaft and the hand-wheel shaft, and enables the operator to manipulate the main-shaft substantially as effectively as if the driving gear were fixed against rotation upon the driving shaft, as has been common heretofore.

Having thus set forth the nature of the invention, what I claim herein is:—

1. In a sewing machine, the combination with a frame comprising a hollow standard and a tubular arm extending laterally therefrom, and a rotary driving shaft journaled in and extending longitudinally of said arm and transversely through said standard, of a driven shaft disposed in angular relation with the driving shaft and journaled in said standard, a hand-wheel and a driven gear-wheel fixed upon the driven shaft, a driving gear loosely mounted upon the driving shaft in permanent driving relation with the driven gear and carrying the driven member of a friction clutch, a driving clutch-member slidingly mounted upon the driving shaft for movement into and out of operative relation with the driven clutch-member and connected to rotate with said shaft, and a centrifugal governor rotating with said driving shaft and connected with the driving clutch-member for automatically shifting the latter out of and into operative relation with the driven clutch-member while the driving shaft is in motion.

2. In a sewing machine, the combination with the frame, a rotary driving shaft journaled therein and sustained against endwise movement in relation thereto, and a driven shaft also journaled in said frame and in angular relation with said driving shaft, of a driven gear fixed upon said driven shaft, a driving gear loosely mounted upon the driving shaft in permanent operative relation with the driven gear and carrying one member of a friction-clutch, a collar slidingly mounted upon but connected to rotate with the driving shaft and carrying a clutch-member movable toward and from that of the driving gear and adapted for operative engagement therewith, and a centrifugal governor rotating with said driving shaft and connected with said sliding collar for automatically shifting the same out of and into operative relation with the first-named member, respectively, as the speed of rotation of the main-shaft exceeds or falls below a predetermined limit.

3. In a sewing machine, the combination with the frame comprising a hollow standard and a tubular arm extending laterally therefrom, and a rotary driving shaft journaled in and extending longitudinally of said arm, of a driven shaft disposed in angular relation with the driving shaft, a hand-wheel and a driven gear-wheel fixed upon the driven shaft, a collar fixed upon the driving shaft and provided with an annular peripheral seat and an adjacent peripheral groove upon one side and a shoulder upon the other side of said seat, a driving gear having its hub fitted loosely upon said seat of the fixed collar and arranged in permanent driving relation with said driven gear and formed in one face with a conical clutch member, an annular locking washer having a lateral opening at one side and fitted within said groove and extending beyond the peripheral seat of said fixed collar, a sliding collar mounted upon and connected to rotate with the driving shaft and carrying a conical clutch-member adapted for operative engagement with that of said driving gear, and a centrifugal governor rotating with said driving shaft and operatively connected with said sliding collar for shifting the latter toward and from said driving gear.

In testimony whereof, I have signed my name to this specification, in the presence of two subscribing witnesses.

GEORGE E. MOLYNEUX.

Witnesses:
HENRY J. MILLER,
H. A. KORNEMANN, Jr.

---

Copies of this patent may be obtained for five cents each, by addressing the "Commissioner of Patents, Washington, D. C."